United States Patent [19]

Ostrand et al.

[11] Patent Number: 5,062,473
[45] Date of Patent: Nov. 5, 1991

[54] MOTOR VEHICLE PASSENGER COMPARTMENT HEATING, VENTILATING AND AIR CONDITIONING SYSTEM

[75] Inventors: James C. Ostrand, Armada; William L. Drayer, Romeo, both of Mich.

[73] Assignee: General Motors Corporation, Detroit, Mich.

[21] Appl. No.: 539,398

[22] Filed: Jun. 18, 1990

[51] Int. Cl.⁵ .................. F24F 11/02; F24F 13/08; B60H 3/00
[52] U.S. Cl. .................... 165/42; 165/43; 237/12.3 A; 237/12.3 B; 98/2.11; 137/872
[58] Field of Search .................. 165/42, 43, 16; 237/12.3 A, 12.3 B; 98/2.11, 2; 137/872

[56] References Cited

U.S. PATENT DOCUMENTS

| 4,157,113 | 6/1979 | Kaman et al. | 165/42 |
| 4,420,033 | 12/1983 | Franz | 165/43 |
| 4,842,047 | 6/1989 | Sakurada et al. | 165/43 |
| 4,852,638 | 8/1989 | Hildebrand et al. | 165/42 |

FOREIGN PATENT DOCUMENTS

| 0051615 | 4/1980 | Japan | 165/43 |
| 0068416 | 5/1980 | Japan | 165/43 |
| 0211912 | 12/1983 | Japan | 98/2 |
| 0225414 | 10/1987 | Japan | 98/2 |
| 1246803 | 9/1971 | United Kingdom | 165/43 |

Primary Examiner—John Ford
Attorney, Agent, or Firm—Ronald L. Phillips

[57] ABSTRACT

A motor vehicle passenger compartment heating, ventilating and air conditioning system employing a split heater core. A central opening in the heater core is aligned with an outlet and the temperature of the air discharged into the passenger compartment can be varied by adjusting a pair of air temperature doors.

3 Claims, 3 Drawing Sheets

MOTOR VEHICLE PASSENGER COMPARTMENT HEATING, VENTILATING AND AIR CONDITIONING SYSTEM

TECHNICAL FIELD

This invention relates to motor vehicle passenger compartment heating, ventilating and air conditioning systems and more particularly to the handling of the air flow from an evaporator relative to and from a heater core.

BACKGROUND OF THE INVENTION

In conventional modern day motor vehicle passenger compartment heating, ventilating and air conditioning systems, it is common practice to mount a heater core downstream of an evaporator in an air duct and to continuously circulate engine coolant through the heater core. For air conditioning, refrigerant is circulated through the evaporator, and temperature control is obtained by controlling the flow of air from the evaporator relative to the heater core. For example, for maximum cooling demand all of the air flow from the evaporator is bypassed around the heater core and thence into the passenger compartment. On the other hand, for minimum cooling demand, all the air flow from the evaporator is passed through the heater core and thence delivered to the passenger compartment. And intermediate these two extremes, the bypass flow and that through the heater core are mixed and varied to provide an intermediate temperature air delivery to the passenger compartment. Furthermore, the outlets from the duct downstream from the bypass and heater core are strategically placed to provide the best air distribution for the heating, cooling and defrosting modes as is well known. While such a system has proved very satisfactory, there remains a continuous quest for a reduction in size of the system module as well as improved air flow, temperature blending and flexible delivery control.

SUMMARY OF THE INVENTION

The present invention offers a quite simple solution to meeting these goals with the use of a split heater core. According to the present invention, there is provided an air duct having an inlet and at least three outlets. The evaporator is mounted in the duct as usual but now a split heater core is mounted in the duct between the evaporator and the several outlets. The split heater core has a central opening therethrough that is aligned with a central one of the outlets which serves as an air conditioning outlet while the heater core has heat transfer zones located on opposite sides of central heater core opening opposite the respective other outlets and the latter outlets are in turn located at an upper and lower elevation relative to the central outlet and serve as a defroster outlet and heater outlet respectively. Mode door means are then provided for opening the air conditioning outlet while closing the other outlets and vice versa and, in addition, temperature door means are provided for opening and closing both the central heater core opening and the heater core heat transfer zones. As a result, there is provided a smooth flow pattern directly through the split heater core which results in improved air conditioning air flow. Moreover, the temperature door means, as it closes the central heater core opening and opens the heater core heat transfer regions, reduces flow through the former while introducing heated air from the latter to provide better mixing for delivery out the outlets than with the conventional bypass arrangement. Then in what is normally known as a bi-level mode, the lower one of the three outlets (the heater outlet) is opened while the upper one (the defroster outlet) is closed by the mode door means so that upper warm air is mixed with the air conditioned air for the central outlet (the air conditioning outlet) and the warmer lower air is discharged directly from the heater outlet. Moreover, with this arrangement, both the defroster and the heater outlets can be separately served by the split heater core to achieve an infinite variety of modes and temperatures by combinations of various openings of the two door means through individual control of each of the outlets, the central heater core openings, and both of the heater core heat transfer zones.

It is therefore an object of the present invention to provide a new and improved motor vehicle passenger compartment heating, ventilating and air conditioning system.

Another object is to provide in a motor vehicle passenger compartment heating, ventilating and air conditioning system, a split heater core that is located downstream of an evaporator and both an air temperature and mode door arrangement for controlling air flow relative to and from the split heater core.

Another object is to provide in a motor vehicle passenger compartment heating, ventilating and air conditioning system, a split heater core that is mounted in an air duct downstream of an evaporator and has a central opening through which air is selectively circulated as well as directly through the heater core zones either side thereof and from which air is delivered to the vehicle passenger compartment through various selectively openable outlets including an outlet opposite the central opening of the split heater core as well as outlets opposite the heating zones of the core.

These and other objects, advantages and features of the present invention will become more apparent from the following description and drawing in which:

DESCRIPTION OF THE PREFERRED EMBODIMENT

Figure 1:
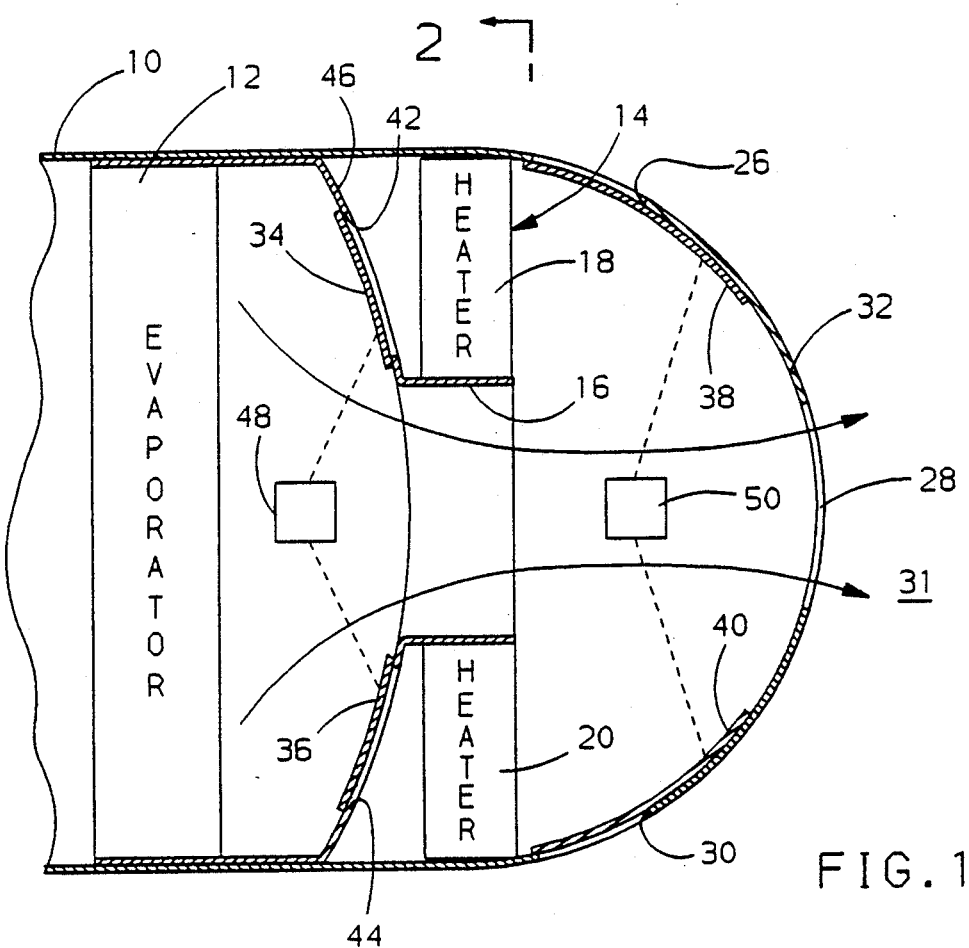
FIG. 1 is a diagrammatical longitudinal sectional view of a portion of a motor vehicle passenger compartment heating, ventilating and air conditioning system according to the present invention.
Figure 2:
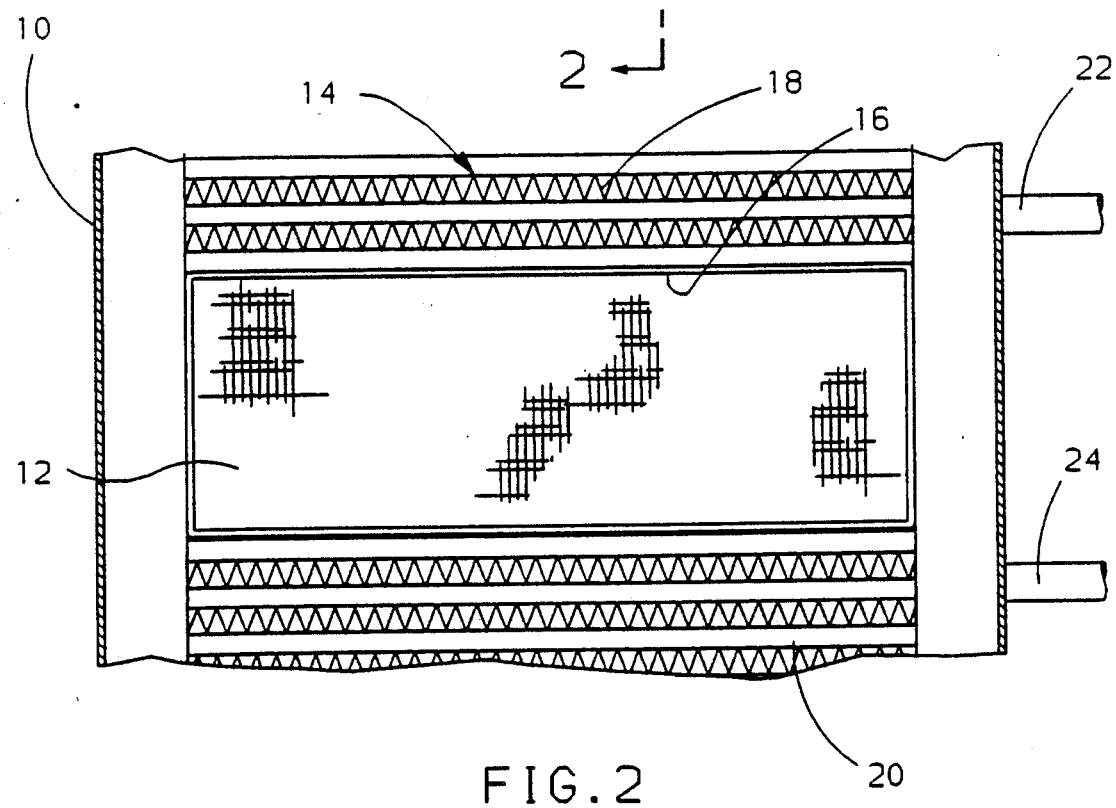
FIG. 2 is a view of the heater taken along the line 2—2 in FIG. 1.

Referring to FIG. 1, there is shown a terminal portion of a motor vehicle passenger compartment, heating, ventilating and air conditioning system comprising an air duct 10 having both an evaporator 12 and a split heater core 14 mounted therein. Air from a blower (not shown) is delivered to the evaporator where it passes therethrough and is then either directed through a central opening 16 in the heater core and/or through two heater exchanger zones 18 and 20 of the heater core located on opposite sides of the central opening 16 as seen in both FIGS. 1 and 2. The evaporator 12 receives refrigerant in vaporous form on demand from a condenser (not shown) following expansion in a conventional manner while the heater 18 receives engine coolant continuously from an engine not shown via conduits 22 and 24 as seen in FIG. 2.

The heater 14 is located downstream of the evaporator 12 just ahead of three outlets or openings 26, 28 and 30 formed in the rounded distal end 32 of the duct that extends into the vehicle passenger compartment space 31. The central opening 16 through the heater is centrally aligned with the evaporator 12 and with the intermediately located duct outlet 28 which serves primarily as an air conditioning outlet. The elevated or upper duct 26 opens radially upward in the vehicle passenger compartment and primarily serves as a defroster outlet while the remaining lower outlet 30 is directed radially downward in the passenger compartment toward the feet area and primarily serves as a heater outlet.

Air flow from the evaporator and through the heater is dictated by a pair of double sliding air temperature doors 34, 36 and mode doors 38, 40. The air temperature doors 34, 36 operate on the central opening 16 and also on openings 42 and 44 formed in a wall 46 that spans the duct intermediate the evaporator and heater and contains the central heater core opening 16. The openings 42 and 44 face the upstream side of the respective heater portions 18 and 20 and their respective doors 34 and 36 are actuated as described shortly by linkage 48 suited to that purpose. Similarly, the tandem sliding mode doors 38 and 40 operate on the outlets 26, 28 and 30 and are actuated, as will also be described shortly, by linkage 50 suited to that purpose.

Describing now the various primary modes available, FIG. 1 shows the system in an air conditioning mode. In this mode, the linkage 48 is operated to have the air doors 34 and 36 close the respective openings 42 and 44 and open the central opening 16 while the linkage 50 is operated so that the mode doors 38 and 40 close the respective defroster outlet 26 and heater outlet 30 and open the air conditioning outlet 28. As a result, all the air cooled by the evaporator is directed centrally through the opening 16 in the heater core bypassing its heating zones and thence directly out the air duct central outlet 28 as shown by the arrows. Thus, there is provided a very smooth flow pattern directly from the evaporator through the heater core free of the latter's restriction and also its heat addition.

Figure 3:
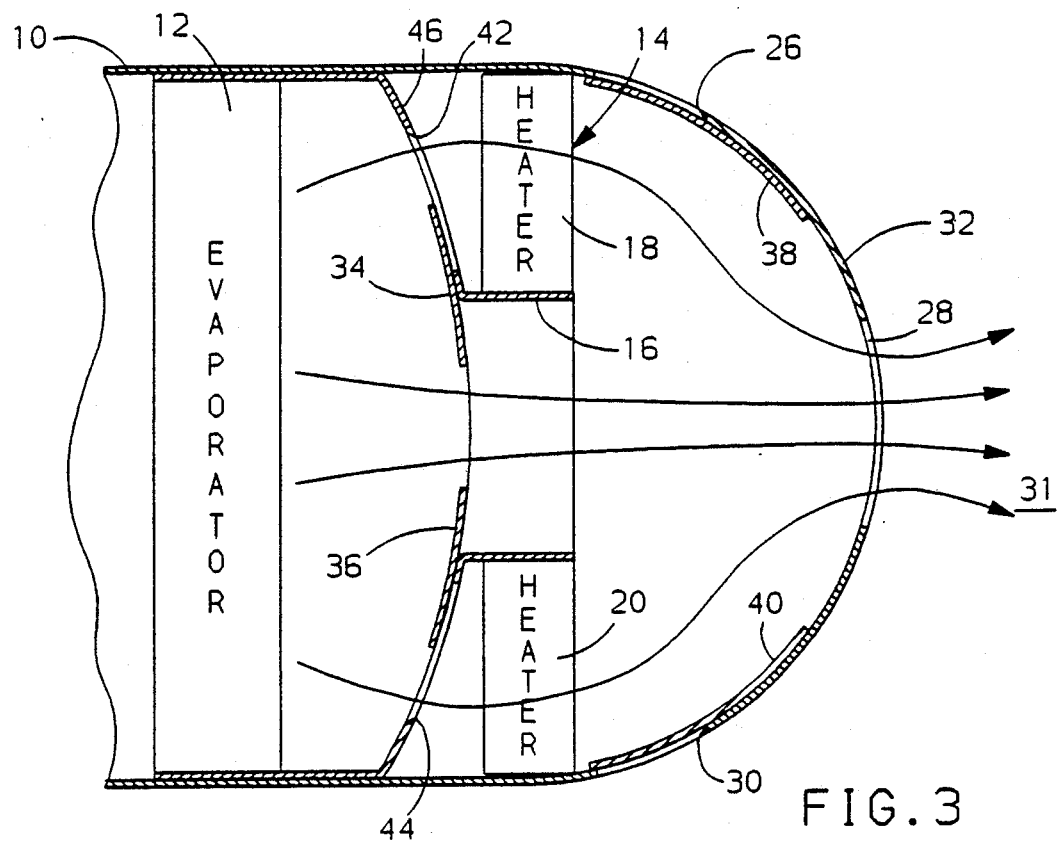
FIG. 3 is a view similar to FIG. 1 but showing the temperature doors in a different position.

For improved mixing and air temperature control in what will be referred to as a blend mode, the temperature doors 34 and 36 are operated as shown in FIG. 3 wherein the duct outlets 26 and 30 remain closed by their respective mode doors 38 and 40 and the air conditioning outlet 28 remains open while the temperature doors 34 and 36 are moved to mid-positions where they partially open the respective openings 42 and 44 to the heater zones while also partially closing the central opening 16. The resulting air flow is illustrated by the arrows wherein a portion of the cooled air from the evaporator is allowed to flow smoothly and directly through the heater core as in the air conditioning mode. But now some of the evaporator air is also directed to separate and flow through the two heater zones whereafter it then efficiently mixes with the centrally directed evaporator air in the duct past the heater air prior to delivery out the air conditioning outlet 28.

Figure 4:
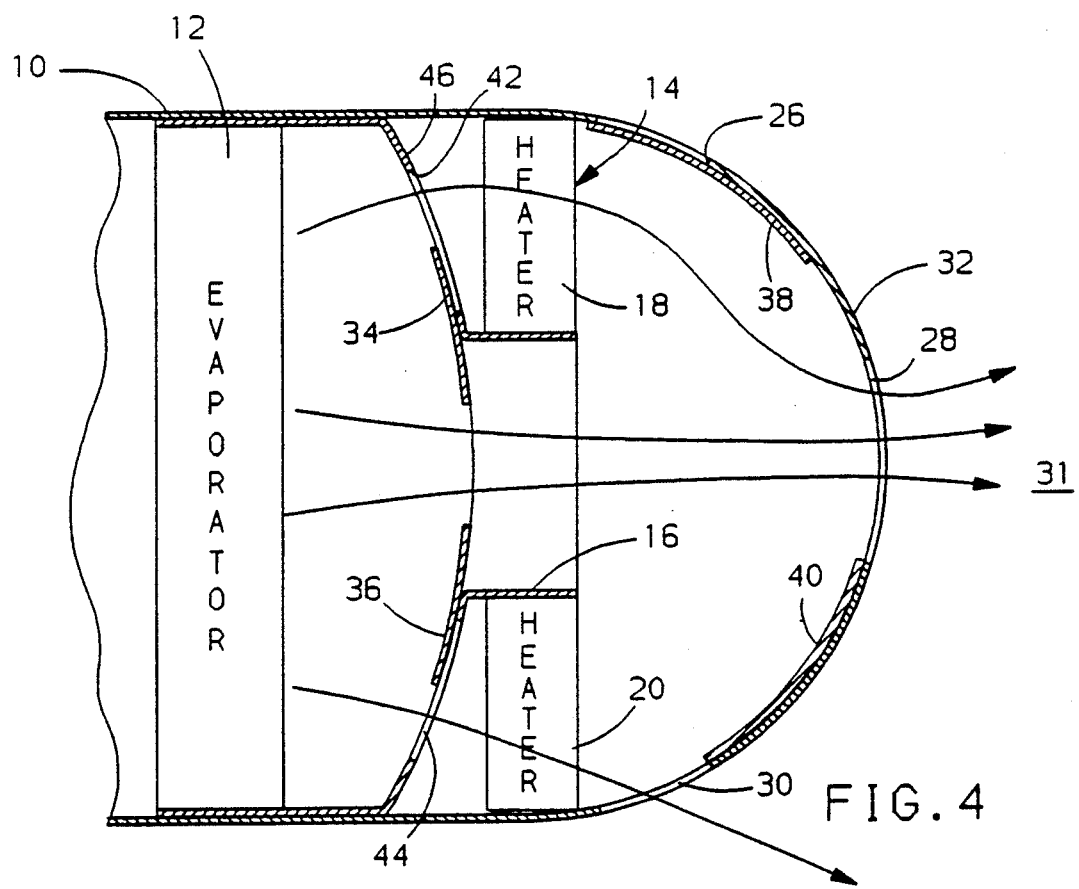
FIG. 4 is a view similar to FIG. 3 but showing the mode doors in another position.

A bi-level mode is provided by operating the air doors as shown in FIG. 4. In this mode, both of the air temperature doors 34 and 36 and also the upper mode door 38 remain as in the above FIG. 3 mode but now the lower mode door 40 is operated to open the heater outlet 30 while continuing to leave the air conditioning outlet 28 open so that warmer lower air is discharged from the heater outlet while good mixing continues between the centrally directed cool air and the upper warmed air as shown by the arrows.

Figure 5:
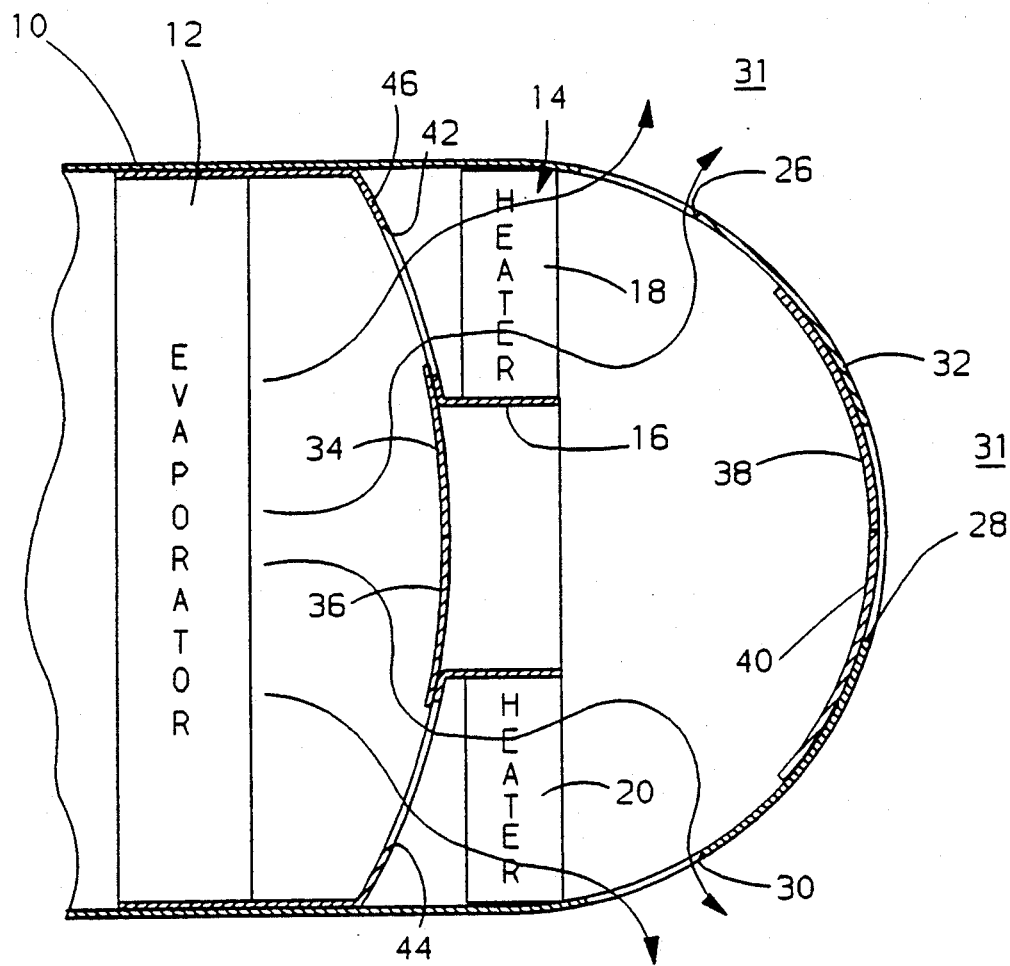
FIG. 5 is a view similar to FIG. 4 but showing both the air temperature doors and mode doors in still another position.

FIG. 5 illustrates that both defroster and heater conditions can be separately served by the split heater core. In this mode, the temperature doors 34 and 36 are operated to cooperatively close the central opening 16 through the heater core while fully opening the respective openings 42 and 44 to the heater zones 18 and 20. At the same time, the mode doors 38 and 40 are operated to cooperatively close the central outlet 28 while fully opening the respective defroster outlet 26 and heater outlet 30. As a result, heated air from the upper zone is directed through the defroster outlet 26 for defrosting purposes while heated air is also being delivered downward through the heater outlet 30 to the passenger compartment's lower zone as shown by the arrows.

Furthermore, it will be appreciated that an infinite variety of modes and temperatures can be achieved by various combinations of openings and closings of the double sliding temperature doors and double sliding mode doors. Such variations could, for example, include individual control of each door in all of the above described modes.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A motor vehicle passenger compartment heating, ventilating and air conditioning system comprising an air duct having an inlet and at least three outlets, an evaporator mounted in said duct, a split heater continuously receiving engine coolant mounted in said duct in a singular duct portion between said evaporator and said outlets, said heater having an opening therethrough aligned with one of said outlets, said heater having heat transfer zones located on opposite sides of said opening, said heater opening and heat transfer zones together composing the entire cross-sectional flow area of said singular duct portion, the others of said outlets located in a path downstream of the respective heat transfer zones, mode door means for opening said one outlet while closing said other outlets and vice versa, and air temperature door means for opening said heater opening while closing said heat transfer zones and vice versa.

2. A motor vehicle passenger compartment heating, ventilating and air conditioning system comprising an air duct having an inlet and at least three outlets, an evaporator mounted in said duct, a split heater continuously receiving engine coolant mounted in said duct in a singular duct portion between said evaporator and said outlets, said heater having an opening therethrough aligned with one of said outlets, said heater having heat transfer zones located on opposite sides of said opening, said heater opening and heat transfer zones together composing the entire cross-sectional flow area of said singular duct portion, the others of said outlets located in a path downstream of the respective heat transfer zones, a pair of operatively linked mode door means for cooperatively closing and opening said one outlet while separately opening and closing said other outlets respectively, and a pair of air temperature door means between said evaporator and heater for cooperatively opening and closing said heater opening while separately closing and opening said heat transfer zones respectively.

3. A motor vehicle passenger compartment heating, ventilating and air conditioning system comprising an air duct having an inlet and at least three outlets, an evaporator mounted in said duct, a split heater core continuously receiving engine coolant mounted in said duct in a singular duct portion between said evaporator and said outlets, said heater core having an opening therethrough aligned with one of said outlets, said heater core having core portions located on opposite sides of said opening, said heater core opening and core portions together composing the entire cross-sectional flow area of said singular duct portion, the others of said outlets located in a path downstream of said heater core portions, a pair of sliding mode door means for cooperatively slidably closing and opening said one outlet while separately slidably opening and closing said other outlets, respectively, and a pair of operatively linked sliding air temperature door means at an upstream side of said heater core for cooperatively slidably opening and closing said heater opening while separately slidably closing and opening said heater core portions, respectively.

* * * * *